United States Patent
Ritter

(10) Patent No.: US 6,607,797 B1
(45) Date of Patent: Aug. 19, 2003

(54) TEXTILE GAS BAG MATERIAL, A PROTECTIVE CUSHION FOR AN OCCUPANT RESTRAINT SYSTEM AND A METHOD FOR PRODUCING THE TEXTILE GAS BAG MATERIAL

(75) Inventor: Philipp Ritter, Wallertheim (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/550,272

(22) Filed: Apr. 13, 2000

Related U.S. Application Data

(63) Continuation-in-part of application No. 09/368,288, filed on Aug. 3, 1999, now abandoned.

(51) Int. Cl.⁷ .............................................. B60R 21/16
(52) U.S. Cl. .................. 428/35.2; 428/36.1; 280/728.1; 280/743.1; 442/65; 442/183; 442/239; 156/148; 139/384 R; 139/420 R
(58) Field of Search .............................. 428/35.2, 36.1; 280/728.1, 743.1; 442/65, 239, 242, 250, 251, 183; 156/148; 139/384 R, 420 R

(56) References Cited

U.S. PATENT DOCUMENTS

| | | |
|---|---|---|
| 4,025,684 A | 5/1977 | Neidhardt |
| 5,259,645 A | 11/1993 | Hirabayashi et al. |
| 5,707,711 A * | 1/1998 | Kitamura .................... 428/193 |
| 5,846,604 A * | 12/1998 | Caldwell .................... 427/245 |

FOREIGN PATENT DOCUMENTS

| | | |
|---|---|---|
| DE | 2164627 | 7/1972 |
| DE | 4232947 | 4/1993 |
| DE | 19548979 | 3/1997 |
| DE | 19743626 | 4/1998 |
| EP | 0496894 A1 | 8/1992 |
| EP | 0761868 | 3/1997 |
| JP | 04201649 | 7/1992 |
| WO | 9419215 | 9/1994 |

* cited by examiner

Primary Examiner—Kenneth R. Rice
(74) Attorney, Agent, or Firm—Tarolli, Sundheim, Covell & Tummino L.L.P.

(57) ABSTRACT

A textile air bag material for a protective cushion in an pant restraint system is disclosed. The textile air bag material is composed of a fabric layer having two superimposed wall portions interwoven with each other at their peripheries. The wall portions have a first side with a surface area. On this side a continuous foil of an air-tight material is applied over the entire surface area. Further, a protective cushion made of the textile material and a method for producing the textile material are disclosed.

24 Claims, 2 Drawing Sheets

TEXTILE GAS BAG MATERIAL, A PROTECTIVE CUSHION FOR AN OCCUPANT RESTRAINT SYSTEM AND A METHOD FOR PRODUCING THE TEXTILE GAS BAG MATERIAL

This application is a continuation-in-part of Ser. No. 09/368,288 filed on Aug. 3, 1999, which is now abandoned.

The invention relates to a textile gas bag material, a protective cushion for an occupant restraint system and a method for producing the textile gas bag material.

BACKGROUND OF THE INVENTION

On the textile material for the production of inflatable protective cushions in vehicles, there are made demands which are determined in a decisive manner by the purpose of use and the arrangement of the protective cushion in the vehicle. Whereas in protective cushions against frontal impact a controlled outflow behavior is required for the decrease of energy on impact, protective cushions against lateral impact, in particular in the head region, are to remain effective over a period of up to several seconds. The textile material predominantly used for the manufacture of gas bags are multi-layered fabrics in plain weave, which are either connected partially by sewing processes—or by weaving technique by means of a hopsack weave. The gas permeability of such a fabric can be used in line with specific objectives, in order to realize the outflow behavior which is aimed for in a protective cushion against frontal impact. For protective cushions against lateral impact, on the other hand, additional measures have to be taken, in order to make the wall of the protective cushion practically impermeable to gas. Particularly in protective cushion casings formed of two superimposed fabric layers partially interwoven, which for reasons of manufacturing technique are produced with a hopsack weave, the relatively high gas permeability of the connecting regions must be countered by a high amount of surface coating. For coating, predominantly a silicone material is used, which is applied externally in quantities of more than 100 g/m$_2$.

The high application of coating, however, affects the packing volume, structural rigidity and static friction.

A textile gas bag material comprising a fabric layer having two superimposed wall portions interwoven with each other at their peripheries is known from U.S. Pat. No. 5,259,645. One of the wall portions is completely coated with a flexible resinous material or an elastomeric material while the other layer is only partly coated.

SUMMARY OF THE INVENTION

The present invention provides a textile gas bag material which with reduced expenditure ensures a reduction in mass of the protective cushion casing, a reduction of the packing volume and of the wall rigidity and also a reduction of the static friction. The textile gas bag material according to the invention is a composite material of at least one fabric layer having two superimposed wall portions interwoven with each other at their peripheries. The wall portions have a first side with a surface area. On this side at least one foil of an air-tight material is applied over the entire surface area. The air-tightness of the gas bag material is ensured by the applied foil. Any application of a coating can consequently be reduced to a quantity required for interconnecting the textile layer and the foil. Despite the savings involved therewith, the gas bag material according to the invention is superior, because the overall thickness of the protective cushion casing is reduced, likewise the rigidity of the protective cushion casing. This leads to an improved folding- and unfolding behavior, further improved by a smooth outer surface of the foil which has a favorable effect on the static friction.

The application of the foil on the fabric layer can be made with the use of conventional technology such as lining/laminating. In particular, the foil can be brought into bond with the fabric layer by substances having lower viscosity, which are of the same type as the coating material used in conventional structures. However, only the quantity of coating is used which is necessary to bring about a bond between foil and fabric layer, because the coating must not make any contribution to the gas-tightness. Whereas in conventional gas bag constructions of this application, coating quantities of 125 g/m$_2$ and above are used, in the textile gas bag material according to the invention, the adhesive is used in quantities of no more than 100 g/m$_2$. Specific adhesives can even be used in quantities of less than 50 g/m$^2$.

Further, the invention provides a protective cushion for an occupant restraint system with the casing of the protective cushion being made of a textile gas bag material according to the invention. Preferably, a first side of the wall portions of the protective cushion on which the foil of an air-tight material is applied to is the outer side of the protective cushion. This is advantageous because the wall portions of the fabric layer, which are interwoven before they are coated, do not have to be turned inside out as required in the production of conventional protective cushions with an inside coating. The foil applied to the outside of the cushion has surprisingly shown to withstand the pressure occurring upon inflation of the protective cushion and does not detach from the fabric layer. Providing the foil on the outside of the protective cushion has the further advantage that the hot gasses flowing into the protective cushion do not deteriorate the foil whereas an inside coating might be damaged.

Finally, the invention provides a method for producing the textile gas bag material according to the invention.

BRIEF DESCRIPTION OF THE DRAWINGS

Further advantages and features of the invention will be apparent from the following description with reference to the drawings. In the drawings.

DETAILED DESCRIPTION OF INVENTION

Figure 1:
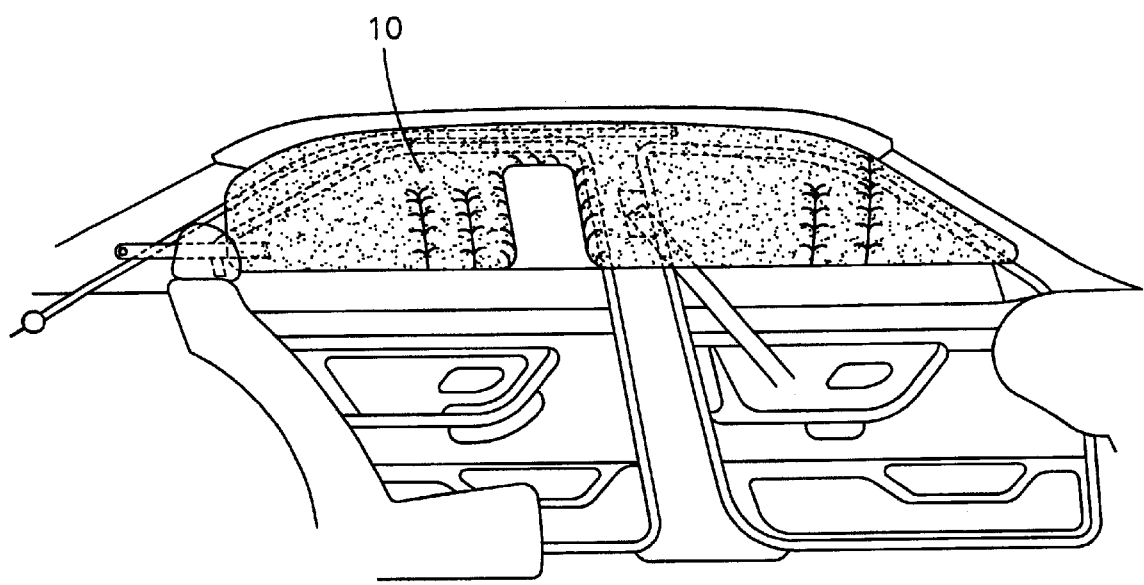
FIG. 1 shows diagrammatically a vehicle interior with an inflated protective cushion, which extends from the A-column via the B-column up to the C-column.

The inflatable protective cushion 10 in an occupant restraint system shown diagrammatically in FIG. 1 covers, in activated state, the side windows of the vehicle and forms a side impact protection in the head and torso region. The casing of the protective cushion consists of a fabric layer with two wall portions woven with each other partially on the periphery and at selected intermediate regions. As the available fabric materials do not have a sufficient gas-tightness to ensure the protective effect for a duration of a few seconds, a first side of the wall portions of the fabric layer forming the casing of the protective cushion, i.e. the outer side of the protective cushion, is coated with at least one continuous foil of an airtight material.

Figure 2:
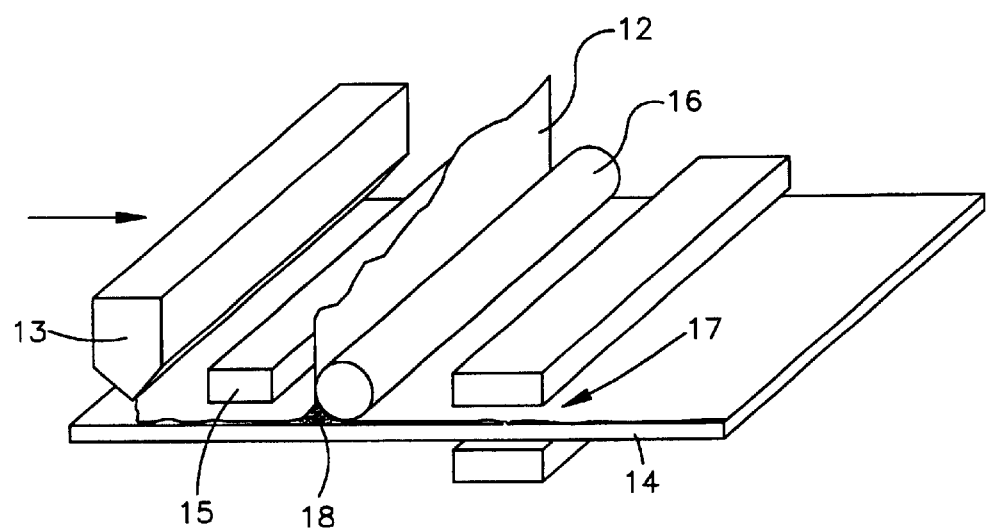
FIG. 2 shows diagrammatically an installation for the application of a foil on a fabric layer using a low-viscous substance.

With the textile gas bag material according to the invention, which is used for the manufacture of the protective cushion 10, the gas-tightness is ensured by at least one foil of air-tight material on the exterior of the fabric layer. FIG. 2 shows the process of the application of a foil 12 on a fabric layer 14 using a low-viscous substance 18 which is introduced on the fabric layer 14 at a conventional coating station 13. The coating station 13 is succeeded by a fixing station 15 where the viscosity of the introduced substance 18 is increased by thermal action. Preferably a thermo-crosslinking substance is used as bonding agent. A silicone or polyurethane is particularly suitable. The fixing station 15 is succeeded by a press roller 16 for vertically supplying the foil 12 and applying the foil 12 on the horizontally travelling fabric layer 14. The durable crosslinking between the foil 12, the low-viscous substance 18 and the fabric layer 14 is obtained by thermal action in a channel 17 or using the heatable roller succeeding the press roller 16. With regard to a problem-free recycling, the foil and the fabric are based on the same polymeric raw material, in particular polyamide. The foil and the bonding agent can also be based on the same polymeric raw material. This polymeric raw material can also be a polyurethane.

Already with foils having a thickness of less than 0.1 mm, the necessary gas-tightness can be achieved. The low-viscous substance only has the task of bringing the foil into bond with the fabric layer. For this, a quantity of no more than 50 g/m$_2$ is sufficient. In view of the rigidity an approximately 15 μm polyetherblockamide foil brought into bond with the fabric layer with an approximately 25 g/m2 bonding agent based on polyurethane has shown to be particularly advantageous.

Figure 3:
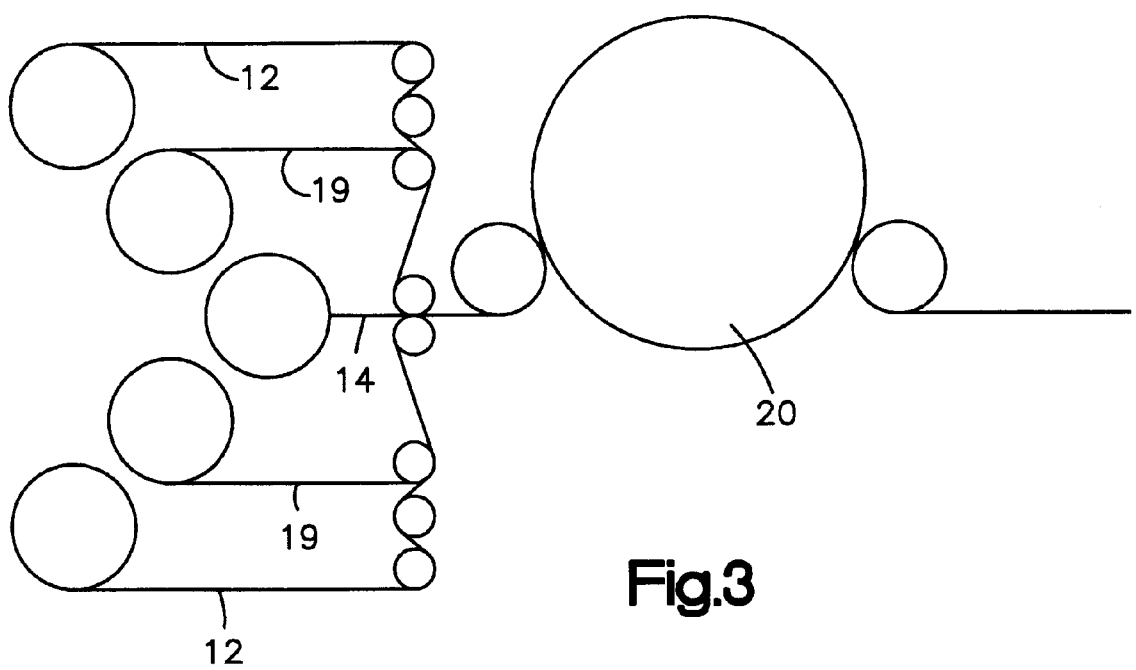
FIG. 3 shows diagrammatically an installation for the application of a foil on a fabric layer using a thermoplastic substance.

FIG. 3 illustrates the process of the application of a foil 12 on a fabric layer 14 using a thermoplastic film 19 at a conventional laminating calender. The thermoplastic film is introduced between the fabric layer 14 and the air-tight foil 12 before they are heated by at least one heatable roller 20. The thermoplastic solidity of the connecting film 19 has to be at least 15° C. lower than the solidity of the fabric layer. 30 μm connecting films 19 based on modified polyolefines having a melting point in a range between approximately 85 and 105° C. have shown to be particularly advantageous. In this embodiment, too, an approximately 15 μm polyetherblockamide foil used as the air-tight foil 12 shows particularly advantageous characteristic in view of the rigidity. However, depending on the purpose of use, foils based on modified polyolefines having a higher temperature stability may be employed. The temperature stability should be at least 120 to 130° C.

The gas bag material is particularly advantageous with regard to the costs when the air-tight foil 12 and the connecting film 19 are produced by a co-extrusion process. Thus, actually only one foil is produced which on both sides is composed of polymers of different thermal resistance.

For the purpose of a protective cushion, especially for the head region in a roll-over of the vehicle, the protective cushion casing is constructed without vent openings. The foil is to have a shrinkage of less than 15% in both directions under the action of heat.

I claim:

1. A textile gas bag material comprising:
   at least one fabric layer having two superimposed wall portions interwoven with each other at their peripheries,
   the wall portions having a first side with a surface area on which at least one continuous foil of an air-tight material is applied over the entire surface area,
   the foil bonding with the wall portions of the fabric layer by a separate low-viscous adhesive substance applied between the fabric layer and the foil, the low-viscous substance being applied in a quantity of no more than 100 g/m$^2$,
   the low-viscous substance having a melting point temperature lower than the melting point temperature of the foil so that the low-viscous substance bonds to the fabric and foil without melting the foil.

2. The textile gas bag material according to claim 1, wherein the low-viscous substance has thermo-crosslinking properties.

3. The textile gas bag material according to claim 1, wherein the foil and the fabric are based on the same polymeric raw material.

4. The textile gas bag material according to claim 3, wherein the polymeric raw material is a polyamide.

5. The textile gas bag material according to claim 1, wherein the foil and the low-viscous substance are based on the same polymeric raw material.

6. The textile gas bag material according to claim 5, wherein the polymeric raw material is a polyurethane.

7. The textile gas bag material according to claim 2, wherein the thermo-crosslinking substance is a silicone or polyurethane.

8. The textile gas bag material according to claim 1, wherein the foil has a thickness of less than 0.1 mm.

9. The textile gas bag material according to claim 1, wherein the low-viscous substance is applied in a quantity of no more than 50 g/m$^2$.

10. The textile gas bag material according to claim 1, wherein the foil is brought into bond with the wall portions of the fabric layer by a thermoplastic substance.

11. The textile gas bag material according to claim 10, wherein the thermoplastic substance is a film having a thermoplastic solidity being at least 15° C. lower than the solidity of the fabric layer.

12. The textile gas bag material according to claim 11, wherein the film is based on a modified polyolefine having a melting point in a range between approximately 85 and 105° C.

13. The textile gas bag material according to claim 10, wherein the foil is based on a modified polyolefine having a temperature stability of at least 120° C.

14. The textile gas bag material according to claim 1, wherein the foil is a polyetherblockamide foil.

15. The textile gas bag material according to claim 1, wherein the foil under the action of heat has a shrinkage of less than 15% in two mutually perpendicular directions.

16. The textile gas bag material according to claim 1, wherein no vent openings are provided.

17. A protective cushion for an occupant restraint system, said cushion being a side curtain, said side curtain comprising:
   at least one fabric layer having two superimposed wall portions interwoven with each other at their peripheries,
   the wall portions having a first side with a surface area on which at least one continuous foil of an air-tight material is applied over the entire surface area,
   the foil bonding with the wall portions of the fabric layer by a separate low-viscous substance applied between the fabric layer and the foil, the low-viscous substance being applied in a quantity of no more than 100 g/m$^2$, the low-viscous substance having a melting point temperature lower than the melting point temperature of the foil so that the low-viscous substance bonds to the fabric and foil without melting the foil.

18. The protective cushion according to claim 17, wherein the first side of the wall portions on which the foil of an air-tight material is applied is the outer side of the protective cushion.

19. A method for producing a textile gas bag material, said method comprising the steps of:

interweaving at least two fabric wall portions of a fabric layer at their peripheries; and bonding at least one continuous foil of an air-tight material over the entire surface area of the first side of the wall portions, wherein the foil is bonded to the fabric wall portions by a separate low-viscous substance comprising a bonding agent, the low-viscous substance being used in a quantity of no more than 100 g/m$^2$, the low-viscous substance having a melting point temperature lower than the melting point temperature of the foil so that the low-viscous substance bonds to the fabric wall portions without melting the foil.

20. The method according to claim 19, wherein the low-viscous substance is applied to the fabric wall portions at a coating station, the coating station being succeeded by a fixing station where the viscosity of the low-viscous substance is decreased by thermal action.

21. The method according to claim 20, wherein the fixing station is succeeded by a press roller for vertically supplying the foil to the horizontally travelling fabric layer and further by one of a channel and heatable rollers for obtaining a durable crosslinking between the foil, the low-viscous substance and the fabric layer by thermal action.

22. The method according to claim 19, wherein the foil is bonded to the fabric wall portions by a thermoplastic film which is introduced at a conventional lamination calender.

23. The method according to claim 22, wherein the thermoplastic film is introduced between the fabric layer and the foil before the fabric layer and the foil are heated by at least one heatable roller.

24. The method according to claim 22, wherein the foil and the thermoplastic film are produced in a co-extrusion process, the foil and the thermoplastic film having different thermal resistances.

* * * * *

UNITED STATES PATENT AND TRADEMARK OFFICE
CERTIFICATE OF CORRECTION

PATENT NO. : 6,607,797 B1
DATED : August 19, 2003
INVENTOR(S) : Philipp Ritter

It is certified that error appears in the above-identified patent and that said Letters Patent is hereby corrected as shown below:

<u>Title page,</u>
Insert Item -- [30] Foreign Application Priority Data
April 13, 1999      [DE] Germany……….. 299 06 583.3 --.

Signed and Sealed this

Twenty-ninth Day of June, 2004

JON W. DUDAS
*Acting Director of the United States Patent and Trademark Office*